United States Patent [19]
Kopf et al.

[11] 3,777,608
[45] Dec. 11, 1973

[54] SHEAR FOR METAL PLATE

[75] Inventors: Gerhard Kopf, Dillingen; Adolf Muller, Hilchenbach-Dahlbruch, both of Germany

[73] Assignee: Siemag Siegener Maschinenbau GmbH, Hilchenbach-Dahlbruch, BRD, Germany

[22] Filed: July 22, 1971

[21] Appl. No.: 165,027

[30] Foreign Application Priority Data
July 25, 1970 Germany................ P 20 36 963.5
Dec. 30, 1970 Germany................ P 20 64 448.8

[52] U.S. Cl.................. 83/517, 83/519, 83/560, 83/635, 83/646
[51] Int. Cl............................................. B23d 31/00
[58] Field of Search................ 83/560, 646, 647.5, 83/644, 635, 516, 517, 513, 519

[56] References Cited
UNITED STATES PATENTS

| | | | |
|---|---|---|---|
| 3,293,969 | 12/1966 | Greis | 83/646 X |
| 3,272,042 | 9/1966 | Haas | 83/560 X |
| 3,540,340 | 11/1970 | Koskela | 83/560 X |
| 1,241,254 | 9/1917 | Payne et al. | 83/560 X |
| 1,842,229 | 1/1932 | Achard | 83/647.5 |

FOREIGN PATENTS OR APPLICATIONS

| | | | |
|---|---|---|---|
| 38,084 | 5/1921 | Norway | 83/560 |

*Primary Examiner*—Donald R. Schran
*Assistant Examiner*—James F. Coan
*Attorney*—Norman S. Blodgett

[57] ABSTRACT

A shear for cutting metal plate in which the knives are mounted on C-shaped yokes which are adjustably mounted between spaced, parallel stands.

10 Claims, 4 Drawing Figures

SHEAR FOR METAL PLATE

BACKGROUND OF THE INVENTION

For an economical rolling production of sheet metal, it is necessary to produce the largest possible width of sheet metal plates. The finished roller sheet-metal strips are usually edged along both longitudinal sides as it leaves the rolling mill by the use of double edge shears. Since the desired finished sheet metal width deviates in most cases from the width of the sheet metal plate thus produced, the edge shear forms a single shear line with dividing shears. With its help, the rolled sheet metal plates can be split within certain limits into two or several finished plates of the same or different width. For the longitudinal division or slitting of thinner sheet metal plates, shears with circular blades are usually used, as shown, for example, in the U. S. Pat. No. 1,678,458. For slitting (longitudinal division of heavy plates), shears are used which are equipped with one or more longitudinal knive pairs, as shown in the U. S. Pat. No. 2,110,776.

The adjustment of the circular knife pairs on the well-known slitting shears to allow different slit width is made possible by use of adjusting spindles. However, the adjustment for a different width on the longitudinal slitting shears presents considerable difficulty because the pairs of knives are always positioned together on an upper and a lower cross bar.

U. S. Pat. No. 1,842,229 shows shears for sheet metal in which the pair of knives is adjustable within a door-shaped shear frame extending transversely of the direction of movement of the sheet metal plates to be slitted. A special adjusting carrier is provided for the upper and lower knives wherein the upper knife adjusting carrier is guided on an upper cross bar and the lower knife adjusting carrier is guided on a lower cross bar of the door-shaped frmae of the shears. With this shear design, however, it is very difficult to make an accurate cut adjustment for the upper and lower knives. In order to eliminate these difficulties, longitudinal knife slitting shears with door-shaped shear frames have been created by which the longitudinal knife pair is arranged on a fixed split line relative to the shear frame; the split line (relative to the vertical middle plane of the shear frame) is arranged laterally and the width of the free passage in the door-shaped shear frame is designed wider than the maximum sheet metal width. In such a design of shears, the exact working position of upper knife and lower knife to each other is guaranteed; however, for displacement of the split line, it is necessary either to displace the whole shear frame transversely to the direction of movement of the sheet metal plate, or to push the sheet metal plate transversely of its direction of movement relative to the shear frame. Not only is a strong adjustment drive for the heavy shear frame necessary and a complicated and expensive adjusting means for the sheet metal plate split necessary, but also the shear frame has to bridge-over approximately one-and-a-half times the maximum width, if the sheet metal plate is to be divided into all desired widths. This makes it necessary to use a correspondingly wide frame, which has to be designed very strongly if the deflection of the frame cross bars is to be kept within acceptable limits. In addition, this known slitter design is not suitable to take an additional knife pair with which, at the same time, the division of the sheet metal plate into three or more parts could be achieved. It is, therefore, the purpose of the present invention to provide a shear for edging sheet metal plates, especially heavy plates, in which the frame opening does not have to be much larger than the maximum width of the sheet metal plate and wherein the longitudinal knife pair or pairs for slitting of arbitrary plate widths, are transversely adjustable relative to the frame and are always maintained in their exact cutting positions relative to each other.

With these and other objects in view, as will be apparent to those skilled in the art, the invention resides in the combination of parts set forth in the specification and covered by the claims appended hereto.

SUMMARY OF THE INVENTION

In general, the present invention consists of a shears in which yokes serve to hold and guide the longitudinal knives exactly and are not under stress by the cutting pressure produced, because the cutting forces resulting from the upper-and-lower knives of each shear pair are introduced to the stands directly over the guides. The C-shaped yokes only assure that, during displacement of a knife pair, the two knives are always in the right cutting position relative to each other. The yokes, therefore, may be of light construction.

In slitting shears with only one longitudinal knife pair, a further characteristic of this invention can be considered that the free ends of the C-shaped yoke need only be half of the maximum sheet metal plate width, so that a slitting of sheet metal sections of every selected part of the maximum width is possible. In the case of slitting shears with two longitudinal pairs of knives for division of the sheet metal into three strips, it is especially an advantage of this invention to arrange two C-shaped yokes with their free ends arranged opposite each other, which are guided independently in transverse adjustment. With this arrangement, it is of practical value if the depth of the throat of each of the two C-shaped yokes be at least one-third of the maximum sheet metal width and, preferably, with one yoke having a throat depth equal to half of the maximum sheet metal width. According to the invention, the two ends of each yoke are held in place on both sides by the stand frame, preferably by means of a hydraulic clamping support guide which has the shape of dove-tail guides. Each yoke may be adjusted transversely between the stand frame by its own displacement drive. It has been found to be of advantage that the lower end of each C-shaped yoke carry a straight fixed lower knife; on the upper leg of the C-shaped yoke hangs a bow-shaped upper knife which is capable of rocking movement brought about by a drive carried by the yoke.

It is known in connection with sheet metal shears to support and guide upper and lower knives of one longitudinal knife pair on their free ends by C-shaped yokes, as shown in the U. S. Pat. No. 723,599. In the last-mentioned patent, however, the C-shaped yoke has to take the total cutting force of the upper and lower knives and, consequently, has to be dimensioned accordingly. A further difference, in contrast to shears constructed in accordance with the present invention, is that in this known shear construction the C-shaped yoke forms the fixed shear stand itself, so that the sheet metal plates, in order to set the width of their slit strips, have to displaced transversely to the knife plane.

In wide-strip rolling mills, the slitting shears are arranged in one shear line together with a double edge shear, so that, by full use of the available rolling width, the sheet metal passing through are not only edged along their longitudinal sides, but also it is possible to slit the wide sheet into the different widths of the final sheet metal plates.

The arrangement of double-edge shears together with dividing shears in one shear line at the run-out side of a rolling mill train requires a considerable plant expenditure and also a considerable space requirement; this can only be justified when the most of the rolled wide strip is to be slit into small finished sheet metal widths. Even in this case, the dividing shears are not completely balanced and create an expense factor which cannot be overlooked.

A further practical development of the present shear results in an improvement in the economy on the outlet side of the wide strip rolling train by a lowering of the expenditure for the shear line.

A solution to this problem consists first in that each yoke is provided with a transverse pair of knives located behind the outlet ends of the longitudinal knife pairs. Its cutting edges are located upwards of the cutting plane of the longitudinal knife pairs and its upper knife drive can be disengaged from the upper knife drive of the longitudinal knife pairs. Its upper knife may also be driven independently of the upper knife of the longitudinal knife pairs. In this way, it is possible to use the longitudinal knife shears selectively for edging and for slitting of the sheet metal plates. For the slitting of the sheet metal plates, the transverse knife pairs are switched off compared with the use when edging of the sheet metal plates is required. In this case, it is especially advantageous, according to this invention, to have the upper knife drive for the transverse knife pairs synchronized in its working position with the upper knife drive of the longitudinal knife pairs.

A practical design for a further development of dividing or slitting shears is distinguished by the fact that the upper knife drive, for the transverse knife pairs, can be connected by a gear coupling for cutting work with the upper knife drive of the longitudinal knife pairs, or with the upper knife in the upper position may be blocked for standing still by engagement with a fixed gear segment. For practical purposes, the gear coupling may be operated by a fluid pressure adjusting member.

In known flat knife shears for edging of rolled plate which cannot be used for length cutting or slitting, the upper knife of the transverse knife pair is always moved towards the cut together along with the upper knife of the longitudinal knife pair. The lower knife of the transverse knife pair, however, could be lowered from its end position in comparison to the lower knife of the longitudinal knife pair. With this operation, however, the lowering movement of the lower transverse knife is always made on the back stroke of the upper knife, and only so that, during the cutting stroke downwards, in front of the lower transverse knife, the bent end makes room for the following material feed.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
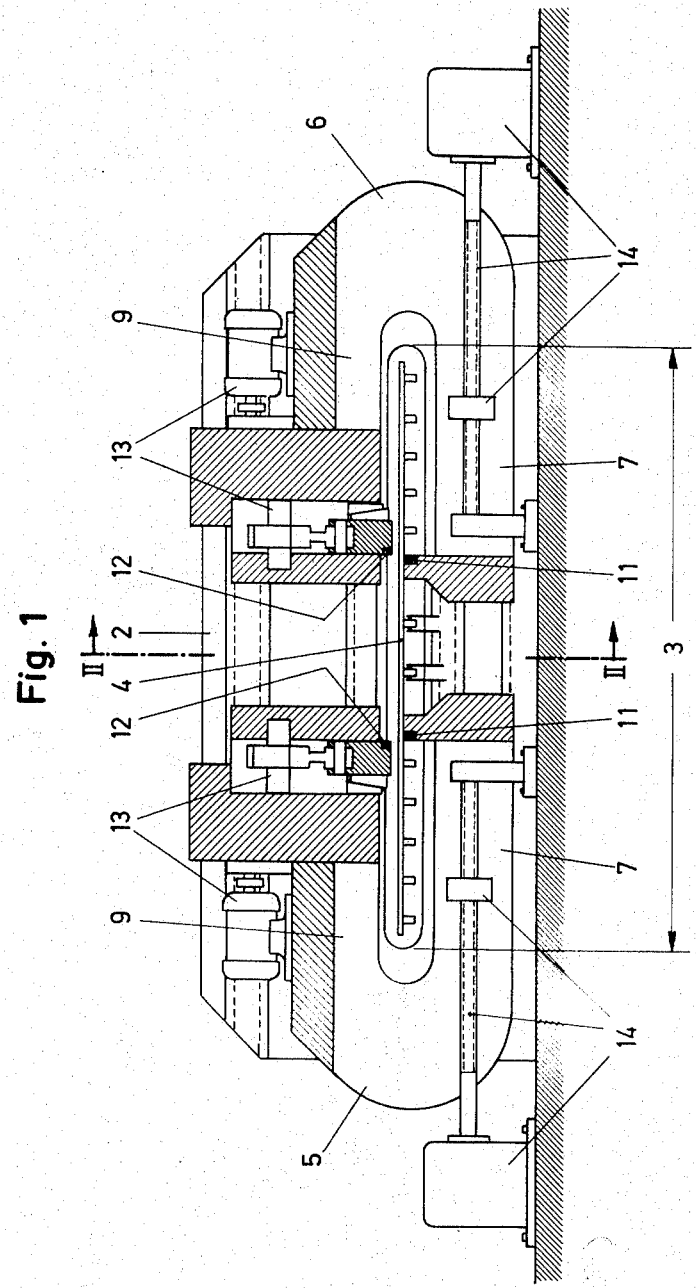
FIG. 1 is a transverse sectional view of a shear constructed in accordance with the principles of the present invention taken on the line I—I of FIG. 2.
Figure 2:
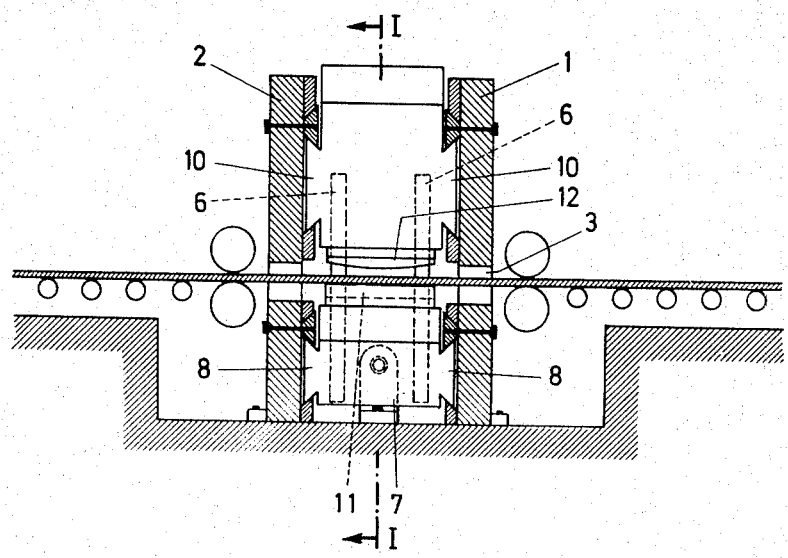
FIG. 2 is a longitudinal sectional view of the shear taken on the line II—II of FIG. 1.

Referring first to FIGS. 1 and 2, the shear is shown as being of the type for cutting heavy plate and has two door-shaped shear stands 1 and 2 arranged in spaced, parallel relationship. A door passage 3 is sized to the maximum width of the metal sheet 4 which is to be divided.

Between the two fixedly-mounted shear stands 1 and 2 are mounted two C-shaped yokes 5 and 6 lying parallel to the plane of the sheet 4. They are guided for movement transversely to the direction of movement of the sheet. One free end 7 of the yokes 5 and 6 is mounted on both sides on support guides 8 underneath the door opening 3 in the shear stands 1 and 2; the yokes are transversely adjustable and clamped by hydraulic means. The upper free end 9 of each of the yokes 5 and 6 is also mounted on its two sides on support guides 10 located above the door opening in the shear stands 1 and 2 to permit transverse adjustment and hydraulic clamping.

The two C-shaped yokes 5 and 6 have their free ends in opposition and they are guided between the shear stands 1 and 2 as can be seen particularly well in FIG. 1. The lower end 7 of each yoke carries on its free end a straight lower knife 11 and on the free end of the upper end 9 of each yoke an upper knife 12 is adjustably guided into engagement with the lower knife 11. A drive means 13 for the upper knife 12 is mounted on the upper surface of each of the yokes 5 and 6.

Each yoke is equipped with an adjusting drive 14; with its help, the yokes 5 and 6 and with it their knives 11 and 12 can be adjusted transversely between the door-shaped shear stands 1 and 2. By this means, it is possible to adjust the pairs of knives 11 and 12 of the shears to any desired slitting width. It is especially practical to design the lower knives 11 of the shear as elongated knives and that the upper knives 12 have bow-shaped cutting edges. By suitable designing the drive device 13, the upper knives 12 can be adjusted for rocking engagement with the lower knife 11, so that the split cuts on the sheet metal plate are rolling cuts.

When the shears are designed for three-part cuts as shown in the drawing, the throat of the two yokes 5 and 6 is selected so that they can bridge over one-third of the maximum sheet metal plate width. However, it is also possible in some situations to dimension the throat of the yokes 5 and 6 in such a way that at least half of the maximum sheet metal plate width can be bridged over. Since the yokes 5 and 6 do not have to bear the cutting forces of the lower knives 11 and upper knives 12 of the knife pairs, the free length or throat of the yokes can be designed in such a way that any desired strip width may be achieved during cutting of the sheet metal plate 4. The cutting forces acting on lower knife 11 and upper knife 12 are namely transferred directly from the yoke ends 7 and 9 into the door-shaped shear stands 1 and 2; therefore, they do not actually strain the yokes 5 and 6.

Figure 3:
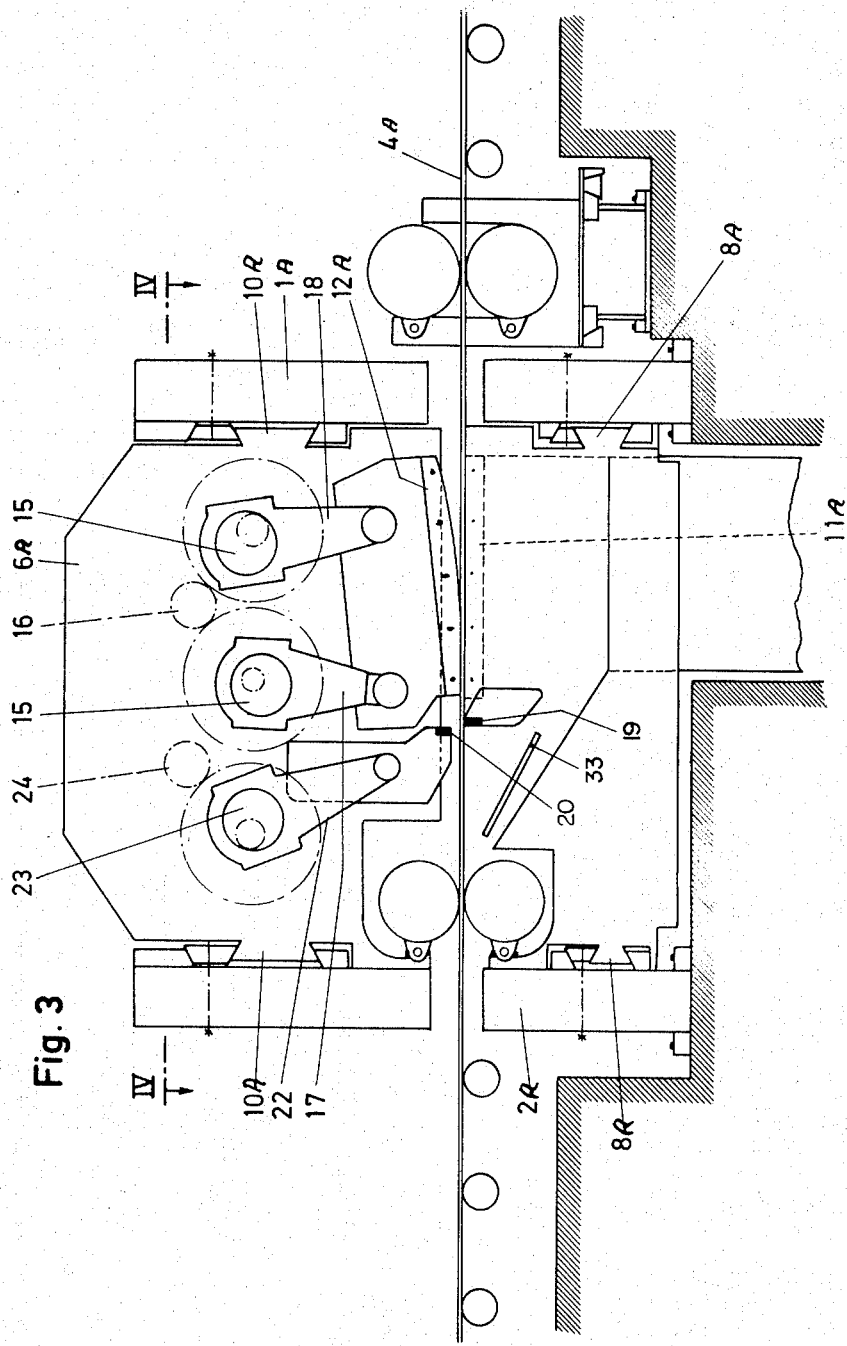
FIG. 3 is a longitudinal sectional view of a modified form of the shear.
Figure 4:
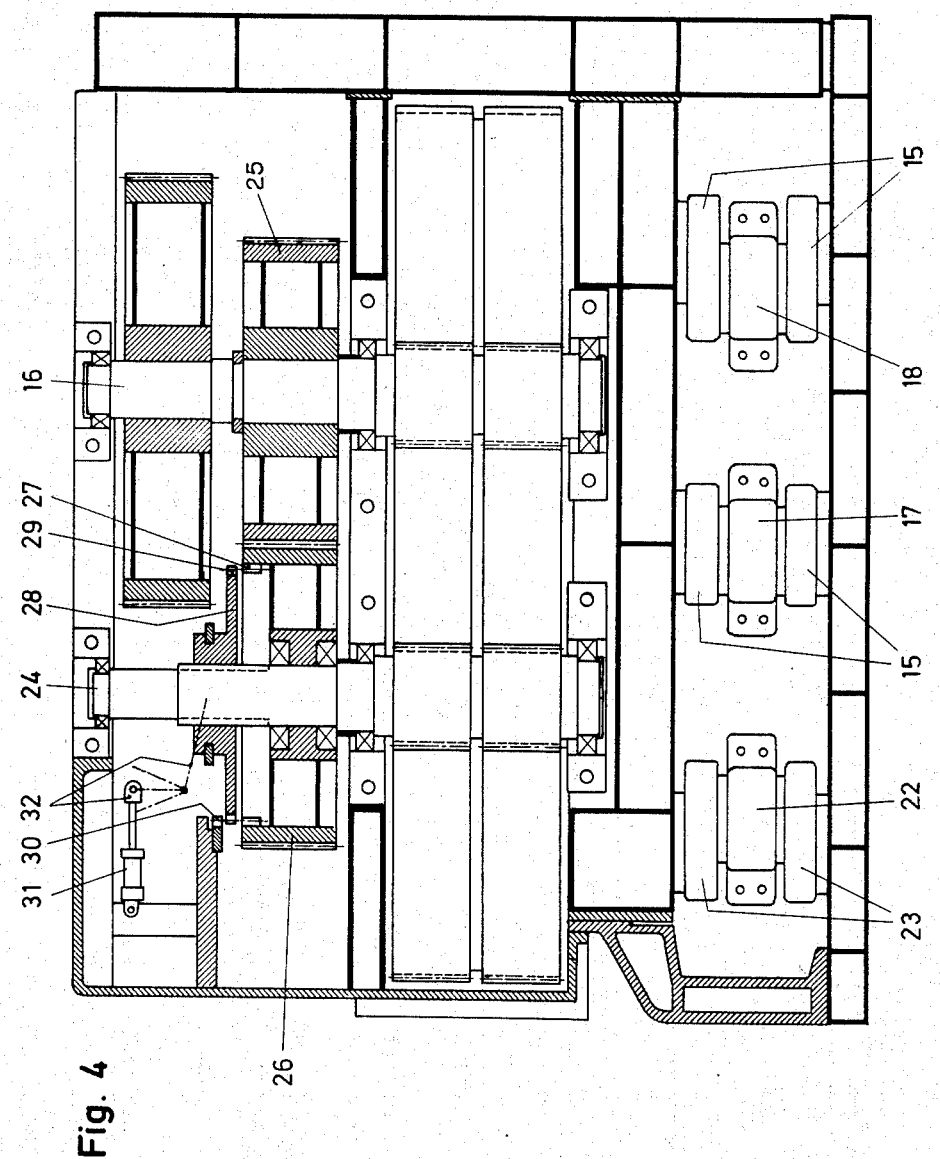
FIG. 4 is a horizontal sectional view of the modified form of the shear taken on the line IV—IV of FIG. 3.

Referring to FIGS. 3 and 4, a shear for the cutting to length and for the edging of sheet metal plates is shown. A transverse pair of knives 19 and 20 is arranged downstream of each pair of longitudinal knives 11A and 12A. The knives 19 and 20 always extend outwardly of the cutting planes of the pairs of long knives 11A and 12A.

The cutting edge of the fixedly-mounted lower transverse knife 19 is positioned at the same elevation as the knife 11A and always in front of it. The upper cross-knife 20 can be moved up and down by a connecting rod 22 and a crank-shaft 23 driven by a drive shaft 24. The drive shafts 24 are supported in the yokes at the same elevation as the drive shafts 16. One gear wheel 25 mounted on the drive shaft 16 continuously engages a gear wheel 26 mounted on the drive shaft 24, as can be seen clearly in FIG. 4. The gear wheel 26 has internal teeth 27 engageable with a coupling wheel 28 which is mounted on the drive shaft 24 for axial displaceable, but so as to be non-rotatable relative thereto. When the coupling wheel 28 is engaged, the gear wheel 26 is connected to the drive shaft 24 and the latter turns along with the drive shaft 16. The upper knives 12 are designed as longitudinal knives and the upper knives 20 designed as transverse knives and are moved up and down by this operation.

When the coupling wheel 28 is disengaged from the internal teeth 27 of the gear wheel 26, the latter turns freely on the drive shaft 24, so the upper transverse knife 20 stands still, and the upper longitudinal knife 12 executes cutting movements.

In order that the upper knife 20 be locked in its upper position when it is standing still, the coupling wheel 28 with its internal gear 29 engages a fixed gear segment 30. In this way, the drive shaft 24 is blocked and, at the same time, the upper cross-knife 20 is also blocked against any movement. The coupling wheel 28 may be moved from one position to the other by a fluid cylinder 31 operating through an angle lever 32 mounted on the drive shaft 24.

When the shears are used for cutting metal plate to length or into strips, according to this invention for dividing of a broad sheet metal band into several finished plate widths, then the upper knife 20 of the two transverse pairs of knives 19 and 20 is blocked in its upper end position by engaging the coupling wheel 28 with the fixed gear segment 30, so that only the upper knives 12 of the longitudinal pairs of knives 11 and 12 may make cutting movements. As can be seen in FIG. 1, for this purpose the cutting planes of the longitudinal knife pairs are adjusted to the desired finished plate width by the adjusting drive 14 by displacing the two yokes 5 and 6 within the shear stands 1 and 2 transversely of the direction of movement of the sheet metal plate 4.

When the sheet metal plate shears are to be used for the edging of run-off plate bands 4, then the coupling wheel 28 with its teeth 29 is pushed into engagement with the inside gears 27 of gear wheel 26. The two drive shafts 16 and 24 turn together and, therefore, the upper knives 12 of the longitudinal knife pairs and the upper knife 20 of the transverse knife pairs are able to make cutting strokes.

For the purpose of edging of sheet metal bands 4, the yokes 5 and 6 within the shear stands 1 and 2 are driven so far apart that the longitudinal knife pairs remove only small seam strips from the sheet metal plates 4, which, thereafter, are divided into short seam strip pieces 33 (see FIG. 3) by the transverse knives 19 and 20. Naturally, it is not necessary to drive the longitudinal knives and the transverse knives by means of the same motor; the longitudinal knives and the transverse knives may have their own drive motors. However, in such a case, it is necessary during the use of the sheet metal shears as edging shears to synchronize the cutting movements of the upper longitudinal knives 12 and the upper transverse knife 20. This may be achieved in a simple way by synchronization switch arrangements between the drive motors.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A shear for sheet metal plate, having at least one longitudinal pair of knives along with a driving means for the upper blade, which pair is held between stands of door-shape arranged one after the other in the direction of movement of the sheet metal plate, the knives of each longitudinal knife pair being held on the free ends of a C-shaped yoke and the latter being displaceably supported between the two stands in guides transversely of the direction of movement of the sheet metal plate, characterized by the fact that to each yoke behind the exit side end of each longitudinal knife pair is arranged a transverse knife pair along with a driving means for the upper blade, the cutting edges of the transverse knife pair extending upwardly from the cutting plane of the longitudinal knife pairs, its upper knife driving means being separable by means of a coupling from the upper knife driving means of the longitudinal knife pair, its upper knife being capable of being driven independently of the upper knife of the longitudinal knife pair.

2. A shear as recited in claim 1,
characterized by the fact that the upper knife driving means of the transverse knife pair is synchronized in operating conditions with the upper knife driving means of the longitudinal knife pair.

3. A shear as recited in claim 2,
characterized by the fact that the upper knife driving means for the transverse knife pair may be connected by a gear coupling for cutting operation with the upper knife driving means of the longitudinal knife pairs or may be locked by engagement with a fixed gear segment with the upper knife lifted.

4. A shear as recited in claim 3,
characterized by the fact that the gear coupling is operated by a pressure fluid adjusting member.

5. A shear as recited in claim 1,
characterized by the fact that the throat of the C-shaped yoke is at least equal to the half of the maximum sheet metal plate width.

6. A shear as recited in claim 1, having two longitudinal knife pairs for division of sheet metal plates into three strips,
characterized by the fact that two symmetrical yokes are mounted in opposition to each other, are guided between the door-shaped stands, and are arranged for independent adjustment relative to each other.

7. A shear as recited in claim 5, characterized by the fact that the depth of throat of the two C-shaped yokes corresponds at least to one third of the maximum sheet metal plate width and one yoke may have a throat depth corresponding to half the maximum sheet metal width.

8. A shear as recited in claim 1, characterized by the fact that the two free ends of each yoke are held by the door-shaped stands on both sides by its own hydraulic clamping guide.

9. A shear as recited in claim 1, characterized by the fact that each yoke is transversely adjustable between the door-shaped stands by means of its own adjusting driving means.

10. A shear as recited in claim 1, characterized by the fact that the lower end of each C-shaped yoke carries a straight fixed lower knife and the upper end carries a bow-shaped upper knife which is engageable with the lower knife by a rocking motion brought about by a drive carried by the yoke.

* * * * *